(12) United States Patent
Guo et al.

(10) Patent No.: US 8,312,008 B2
(45) Date of Patent: Nov. 13, 2012

(54) DOCBASE MANAGEMENT SYSTEM AND IMPLEMENTING METHOD THEREOF

(76) Inventors: Xu Guo, Beijing (CN); Donglin Wang, Beijing (CN)

(*) Notice: Subject to any disclaimer, the term of this patent is extended or adjusted under 35 U.S.C. 154(b) by 792 days.

(21) Appl. No.: 12/391,495

(22) Filed: Feb. 24, 2009

(65) Prior Publication Data

US 2009/0157992 A1 Jun. 18, 2009
US 2012/0117352 A9 May 10, 2012

Related U.S. Application Data

(63) Continuation of application No. PCT/CN2007/070476, filed on Aug. 14, 2007, and a continuation-in-part of application No. 12/133,309, filed on Jun. 4, 2008.

(30) Foreign Application Priority Data

Aug. 25, 2006 (CN) .......................... 2006 1 0126538

(51) Int. Cl.
G06F 17/30 (2006.01)

(52) U.S. Cl. ...................................... 707/719; 707/718
(58) Field of Classification Search .................. 715/200; 707/718, 719
See application file for complete search history.

(56) References Cited

U.S. PATENT DOCUMENTS

| | | | | |
|---|---|---|---|---|
| 5,544,355 A * | 8/1996 | Chaudhuri et al. | ................... | 1/1 |
| 5,600,844 A * | 2/1997 | Shaw et al. | ................... | 715/273 |
| 6,341,281 B1 * | 1/2002 | MacNicol et al. | ..................... | 1/1 |
| 6,370,522 B1 * | 4/2002 | Agarwal et al. | ....................... | 1/1 |
| 7,080,062 B1 * | 7/2006 | Leung et al. | ........................... | 1/1 |
| 7,448,022 B1 * | 11/2008 | Ram et al. | ...................... | 717/120 |
| 7,945,557 B2 * | 5/2011 | Cheng et al. | ................... | 707/713 |
| 2003/0093410 A1 * | 5/2003 | Couch et al. | ...................... | 707/3 |
| 2003/0177137 A1 * | 9/2003 | MacLeod et al. | ............. | 707/102 |
| 2005/0071331 A1 * | 3/2005 | Gao et al. | .......................... | 707/4 |
| 2005/0187917 A1 * | 8/2005 | Lawande et al. | ................... | 707/3 |

FOREIGN PATENT DOCUMENTS

| | | |
|---|---|---|
| CN | 1457459 | 11/2003 |
| CN | 1573759 | 2/2005 |
| JP | 10021125 | 1/1998 |

* cited by examiner

*Primary Examiner* — Doug Hutton, Jr.
*Assistant Examiner* — Brian A Garmon
(74) *Attorney, Agent, or Firm* — David Xue; Goodwin Procter LLP

(57) ABSTRACT

The present invention discloses a method for implementing a docbase management system, in which, an invocation from an application is parsed, the invocation is to build an intermediate form including objects and/or operations of a universal model; the intermediate form is converted into execution plans; a preferable execution plan is selected from the execution plans, the selected execution plan includes operations on physical storage according to an algorithm based on priorities of the experience rules; the selected execution plan is scheduled and executed.

2 Claims, 2 Drawing Sheets

DOCBASE MANAGEMENT SYSTEM AND IMPLEMENTING METHOD THEREOF

CROSS-REFERENCE TO RELATED APPLICATION

This application is a continuation of International Patent Application No. PCT/CN2007/070476 filed Aug. 14, 2007, which is the PCT filing of CN 200610126538.2 filed Aug. 25, 2006, both of which applications are fully incorporated herein by reference. This application is also a continuation-in-part of U.S. Ser. No. 12/133,309, filed Jun. 4, 2008.

BACKGROUND OF THE INVENTION

Field of the Invention

The present invention relates to electronic document processing technologies and particularly to a docbase management system and an implementing method thereof.

A docbase management system provides the functions of organizing, managing, securing, displaying and storing massive documents. A prior application with the application number of CN200510131072.0, filed by the same Applicant of the present application, provides a document processing system which includes a docbase management system, a storage device and an application, wherein data of the docbase management system are saved in the storage device and the docbase management system is connected with the application via a standard invocation interface. The operations to be performed on a document by the application include operations on a predefined universal document model. The application issues instructions to the docbase management system via the standard invocation interface, the process of which also may be called as invocation from the application, the docbase management system performs corresponding operations on data of the docbase in the storage device according to the received instructions.

Since the docbase management system involves a great amount of logic concepts and operations and supports many functions, it is very difficult to create a well extendable, scalable and maintainable docbase management system. The problem can only be approached in a perspective of the system architecture; otherwise the docbase management system cannot be satisfactorily extendable, scalable and maintainable.

SUMMARY OF THE INVENTION

The objective of the present invention is to provide a docbase management system and an implementing method thereof.

The docbase management system provided by the present invention includes:

a first module, adapted to parse a received invocation from an application and generate an execution plan which comprises operations on physical storage;

a second module, adapted to execute the execution plan to schedule a third module to execute the operations on physical storage in the execution plan; and the third module, is adapted to execute the operations on physical storage in the execution plan under the scheduling of the executor.

The first module includes:

a first unit, adapted to parse the received invocation from an application to build an intermediate form which comprises objects and/or operations of a universal document model;

a second unit, adapted to convert the intermediate form into the execution plan which comprises operations on physical storage.

The docbase management system provided by the present invention further includes a fourth module, which is adapted to select a preferable execution plan from execution plans generated by the first module according to a judgment criterion, and then, the second module executes the preferable execution plan to schedule the third module to execute the operations on physical storage in the preferable execution plan.

Furthermore, the fourth module in the docbase management system provided by the present invention is adapted to optimize the execution plans generated by the first module, and the fourth module selects the preferable execution plan from the optimized execution plans. The third module supports the operations on physical storage, wherein the physical storage may include a logical disk partition or physical drive or virtual storage or memory. The virtual storage includes remote storage or network storage. The remote storage includes a network file system or distributive file system, and the network storage includes a storage area network, GRID, or Peer-to-Peer (P2P) network.

The above technical scheme has provided a specific structure of the docbase management system. It can be seen from the technical scheme that, in the present invention, the implementation of docbase management system is divided into a plurality of hierarchies. The hierarchies are independent of each other, which makes the docbase management system well extendable, scalable and maintainable. The fourth module provided by the present invention is adapted to select the preferable execution plan from execution plans so as to improve the execution performance and eventually improve the performance of the whole docbase management system. And the partial optimization of the initial execution plans further lowers the cost of the selected preferable execution plan and improves performance of the whole docbase management system.

The method for implementing the docbase management system provided by the present invention includes:

parsing an invocation from an application and generating an execution plan which comprises operations on physical storage;

scheduling and executing the operations on physical storage in the execution plan.

The process of parsing an invocation from an application and generating an execution plan which comprises operations on physical storage includes:

parsing an invocation from an application to build an intermediate form which comprises objects and/or operations of a universal document model;

converting the intermediate form into an execution plan which comprises operations on physical storage.

The process of converting the intermediate form into an execution plan which comprises operations on physical storage includes:

converting the intermediate form which comprises objects and/or operations of the universal document model into execution plans.

selecting a preferable execution plan from the execution plans according to a judgment criterion;

At this time, the process of scheduling and executing the execution plan includes scheduling and executing the preferable execution plan.

The process of selecting a preferable execution plan from the execution plans according to a judgment criterion includes optimizing the execution plans and selecting the preferable execution plan from the optimized execution plans. The process of optimizing the execution plans includes: optimizing based on any one or any combination of a genetic algorithm, evolutionary algorithm, simulated annealing algorithm, branch and bound algorithm, hill climbing algorithm, heuristic algorithm, artificial neural network algorithm or dynamic programming algorithm.

The invocation from an application is in a XML format or a customized format which is in compliance with a LALR grammar. The intermediate form includes a syntax tree or a document object model tree. The judgment criterion includes experience rules, a time cost or space cost of the execution plan, or the combination of the time cost and the space cost of the execution plan.

The process of selecting a preferable execution plan from the execution plans according to a judgment criterion includes: selecting a preferable execution plan from the execution plans according to an algorithm based on priorities of the experience rules or an algorithm based on weights of the experience rules.

The above technical scheme has provided a specific method for implementing the docbase management system. It can be seen from the above technical scheme that, in the present invention, the implementation of docbase management system is divided into a plurality of hierarchies. The hierarchies are independent of each other, which makes the docbase management system well extendable, scalable and maintainable. Also in the present invention, the preferable execution plan is selected from execution plans so as to improve the execution performance and eventually improve the performance of the whole docbase management system. In addition, the initial execution plans generated by the first module is partially optimized, so that the cost of the selected preferable execution plan is lowered and performance of the whole docbase management system is improved.

DETAILED DESCRIPTION OF THE PREFERRED EMBODIMENTS

This invention is hereinafter further described in detail with reference to the accompanying drawings as well as four embodiments so as to make the objective, technical scheme and merits thereof more apparent.

In embodiments of the present invention, the implementation of the docbase management system is divided into multiple hierarchies and standards for interfaces between hierarchies are defined.

Figure 1:
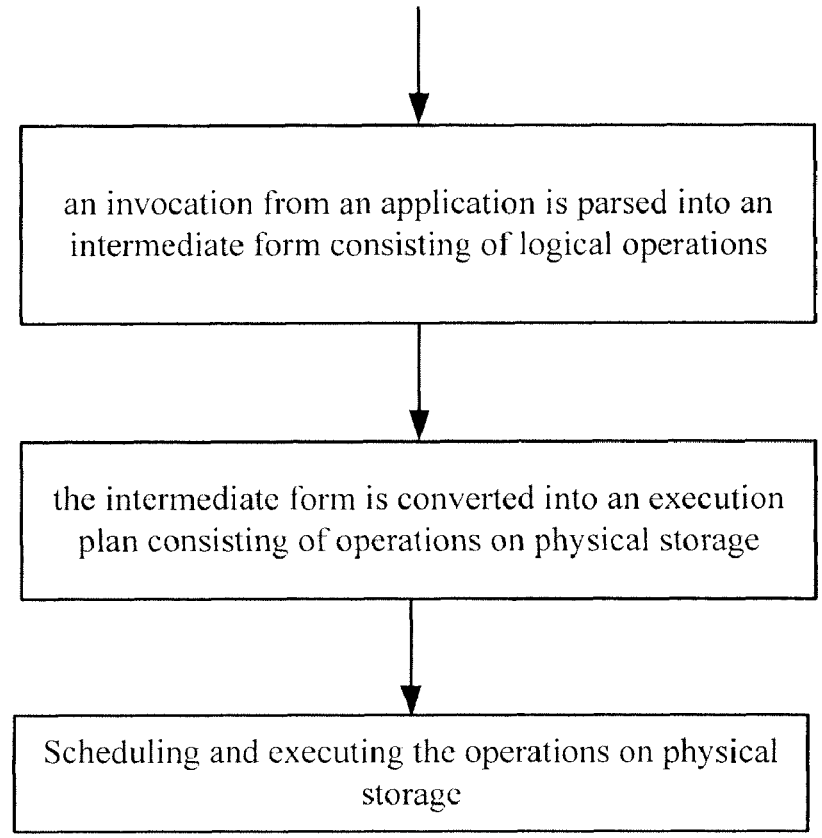
FIG. 1 is a schematic illustrating hierarchical structure of the docbase management system in accordance with the present invention.

FIG. 1 is a schematic illustrating hierarchical structure of the docbase management system in accordance with the present invention. As shown in FIG. 1, in the present invention, the implementation of the docbase management system is divided into multiple hierarchies, which specifically includes: parsing an invocation from an application to build an intermediate form which comprises logical operations, converting the intermediate form which comprises logical operations into an execution plan which comprises operations on physical storage, and executing the execution plan.

In this way, as long as outputs of the hierarchies conform to the corresponding interface standards, the hierarchies may be implemented in different ways, and the docbase management system can be well extendable, scalable and maintainable.

Figure 2:
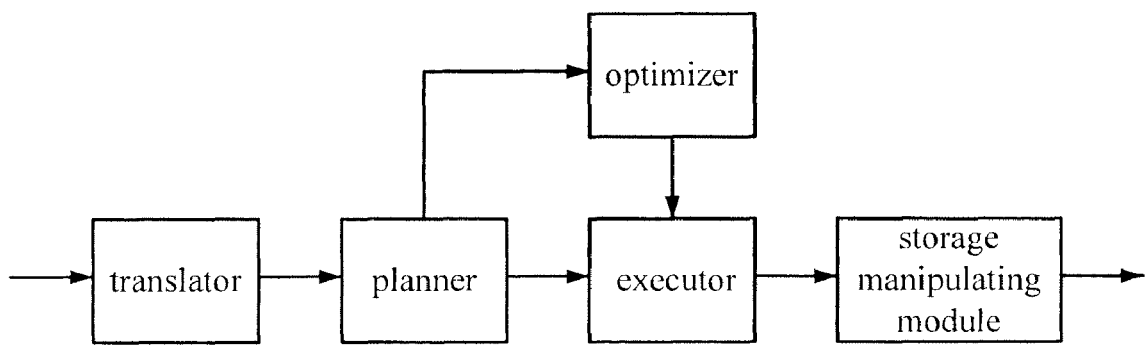
FIG. 2 is a schematic illustrating the docbase management system in accordance with the present invention.

FIG. 2 shows a docbase management system in accordance with the present invention. As shown in FIG. 2, the docbase management system includes a parser, a planner, an executor and a storage manipulating module.

The parser is adapted to parse a received invocation from an application to build an intermediate form consisting of objects and/or operations of a universal document model.

The planner is adapted to convert the intermediate form parsed by the parser into an execution plan consisting of operations on physical storage.

The logical operations which constitute the intermediate form are high level concept. A logical operation may be mapped to one single physical operation or a sequence of physical operations, and there are maybe more than one mapping possibilities. Therefore an intermediate form may be converted into one of plurality of execution plans. So each time the planner is invoked, it may generate different execution plans based on the same intermediate form, however, those different execution plans are equivalent to one another.

The executor is adapted to execute the execution plan converted by the planner to schedule the storage manipulating module to execute the operations on physical storage in the execution plan.

The storage manipulating module is adapted to execute the operations on physical storage in the execution plan under the scheduling of the executor.

The above is a specific structure of the docbase management system. As long as outputs of the hierarchies conform to the corresponding interface standards, the hierarchies may be implemented in different ways, and the docbase management system can be well extendable, scalable and maintainable.

The modules in the above docbase management system will be described in detail as follows.

Specifically speaking, the intermediate form outputted by the parser conforms to interface standard. Specifically, the intermediate form may include a syntax tree or a Document Object Model (DOM) tree. The invocation from the application to the docbase management system via a standard interface is processed by the parser first. The standard interface may be an Unstructured Operation Markup Language (UOML) interface using an Extensible Markup Language (XML), as explained in the prior application of the docbase management system, or may be in form of command strings, or may be in other forms, all of which should conform to the universal document model explained in the prior application of the docbase management system.

The invocation from the application is parsed by the parser based on lexis and syntax and converted into the intermediate form which consists of objects and/or operations of the universal document model and conforms to the interface standard.

In practical application, when the standard interface uses XML, the parser in the docbase management system may be an XML parser which is adapted to parse the invocation from the application and generate a DOM tree. When the standard interface is in form of command strings which usually conform to a Look Ahead Left to Right Parsing (LALR [1]) grammar, if the grammar definition is given, the parser in the docbase management system may be a lexical and syntax parser created by a Lexical complier (Lex) and a Yet Another Compiler Compiler (YACC). The Lex is a tool used for generating a scanner, i.e., a tool for generating a syntax analyzer. The YACC is an automatic tool used for generating a LALR (1) analyzer and the first version of YACC was published in early 1970s by Bell Laboratory (author of which is S. C. Johnson). The two tools are widely employed in platforms such as UNIX and DOS. The XML parsing and the Lex and YACC parsing processes are a part of the prior art.

The parsing of a standard interface invocation in XML is explained as follows.

```
<call>
    <stringVal val="AppendLine" name="MethodName"/>
    <stringVal val="0xabcd1234" name="PathObj"/>
    <compoundVal name="LineObj">
        <line>
            <start xCod="1000.23" yCod="2193.324"/>
            <end xCod="3233.234" yCod="2342.234"/>
        </line>
    </compoundVal>
</call>
```

The above codes indicate a standard interface invocation in XML. The interface method is named Appendline and the task of the method is to append a line to a path object whose handle is 0xabcd1234, the coordinates of the two ends of the line are (1000.23, 2193.324) and (3233.234, 2342.234) respectively.

The parser parses the standard interface invocation in XML and the result of the parsing is a DOM tree, which includes a root element named "call", and three sub elements two named "stringVal" and one named "compoundVal".

The structure of the DOM tree is illustrated as follows:

```
call
    stringVal
    stringVal
    compoundVal
```

A standard interface invocation in a customized language which conforms to LALR(1) grammar is as follows:
call with name=AppendLine, params= (PathObj="0xabcd1234". LineObj=(StartPt=(1000.23, 2193.324), EndPt=(3233.234, 2342.234)));

The parser parses the customized invocation from the application by using a corresponding lexical and syntax parser and then generates a syntax tree. The lexical and syntax parser can be created by invoking Lex and YACC in advance to process lexis and syntax defined by the customized language of Lex and YACC respectively. The syntax tree can be expressed with C structure:

```
struct SyntaxTree
{
    struct Node * pRoot ;
};
struct Node
{
    struct Node *pLeft;
    struct Node *pRight;
    ......
}
```

The tree structure is similar to the structure of the preceding DOM tree.

The following example illustrates the conversion from logical operations to physical operations by the planner when the intermediate form includes a syntax tree.

All logical operations L_OP in the syntax tree are enumerated; herein the logical operations also may be sequences of logical operations. Firstly, a physical operation set ($P\_OP_1$, $P\_OP_2, \ldots, P\_OP_m$) which corresponds to L_OP is obtained; herein the physical operation $P\_OP_j$ also may be a sequence of physical operations. And then, a physical operation $P\_OP_i$ is chosen for the L_OP. Finally, the preceding steps to choose a physical operation for every logical operation are repeated until all the logical operations in the syntax tree are replaced with corresponding physical operations and an execution plan is thus generated.

The conversion of the DOM tree or other kinds of intermediate forms is similar to the conversion process described above.

The intermediate form that includes the DOM tree described above is converted by the planner into an execution plan as follows:

```
AppendLine
    PathObj
    CreateLine
        StartPt
        EndPt
```

The root node AppendLine of the execution plan is an operation, the first sub node PathObj is the handle of object Path, the second sub node CreateLine is also an operation used for creating a line object, and the two sub nodes of CreateLine respectively indicate the starting point and the ending points of the line to be created.

The result of the operation CreateLine includes a line object, and the operation Appendline will add the line object to the object Path.

For the executor in the docbase management system shown in FIG. 2, because an execution plan usually includes a tree which comprises operations on physical storage, so the executor executes the whole execution plan by performing recursion from the root node of the tree corresponding to the execution plan to the leaf nodes of the tree, and scheduling the storage manipulating module to execute the actual operations from the leaf nodes of the tree to the root node.

The following execution plan is an example to illustrate the operation of the executor:

```
OP1
    Para1
    Para2
    OP2
        Para3
        Para4
        OP3
            Para5
            Para6
```

OP1, OP2 and OP3 are three operations and Para1 to Para6 are six parameters of the operations respectively. The executor executes the execution plan according to the following order:

executing OP3 (Para5, Para6), and getting the result res3;
executing OP2 (Para3, Para4, res3), and getting the result res2;
executing OP1 (Para1, Para2, res2), and getting the result res1.

The storage manipulating module in the docbase management system shown in FIG. 2 may be built on varieties of physical or virtual physical storage layers and be restrained by different performances and scales accordingly.

In the practical application, an interface provided by the physical storage layer, i.e., an interface between the storage manipulating module and the physical storage layer, may affect that what kinds of physical operations can be put in the execution plan, so the execution plan generated by the planner also needs to depend on the preset interface. For example, when the physical storage layer provides only the read/write functions of binary streams, the physical operations in the execution plan possibly include only two physical operations: read and write. If the physical storage layer provides more functions, such as create a docbase, create a document set, etc., the execution plan may include more physical operations. The basic objects that the physical storage layer needs to provide include a docbase, document set, document, etc., and the physical storage layer also needs to provide functions of allocating, recycling and reading/writing physical storage.

When media such as a logical disk partition, physical disk, virtual storage and memory is adopted, the ways for implementing the storage manipulating modules in those different types of media are similar. The storage manipulating module may be built based on: a file system provided by the operating system, or a logical disk partition provided by the operating system, or an interface provided by the operating system for accessing the physical disk, or an interface directly accessing the physical disk bypassing the operating system, or an interface provided by the operating system for accessing the virtual memory or physical memory, or an interface directly accessing the physical memory bypassing the operating system, or the virtual storage device. The objects on the physical storage layer, such as docbase, document set and document, can be built accordingly.

The virtual storage may include remote storage, i.e., a physical storage in another computer device accessible through a system such as Network File System (NFS) or Distributive File System (DFS). The virtual storage may also include network storage, i.e., a storage provided by a network, such as the storage in a Storage Area Network (SAN), GRID, Peer-to-Peer (P2P) network, etc.

For example, in a file system, the storage manipulating module performs the following operations:

setting a directory as a docbase;
creating one or multiple document set directories under the docbase directory;
creating one or multiple files as the documents under a document set directory;
creating a page, layer, page content, etc., in a document.

The directory may finally have a structure shown as follows, wherein the documents are shown as the files under the doclist directory:

```
       /... ...
        docbase/
         doclist/
         doclist/
         ... ...
```

The above is the detailed description of implementation of the modules in the docbase management system in accordance with the present invention. From the above description, it can be seen that interfaces between different modules confirm to a universal interface standard. As long as the inputs and outputs are in compliance with the universal interface standard, the modules may be implemented in different ways so as to make the whole docbase management system well extendable, scalable and maintainable.

An intermediate form may be converted into different execution plans by the planner in the docbase management system. The execution plans are equivalent to one another, however, the time and space needed for executing the execution plans usually differ greatly. Therefore, whether the execution plan chosen from an execution plan set is preferable will greatly influence the performance of the docbase management system.

So, in an embodiment of the present invention, the docbase management system shown in FIG. 2 may further include an optimizer, which is adapted to select a preferable execution plan from the execution plan set corresponding to the intermediate form according to a preset judgment criterion.

Specifically, after the planner generates a number of execution plans, for example, the planner may generate a number of execution plans at random, the optimizer selects the optimum execution plan from the generated execution plan set according to the judgment criterion. It should be pointed out that the "optimum" execution plan is selected based on the judgment criterion or practical requirements. For example, an optimum execution selected to meet the judgment criterion which require shortest execution time may need large execution space, therefore the execution plan will not be the "optimum" when the judgment criterion require smallest execution space. The judgment criterion may be based on experience rules or the cost of the execution plan, i.e., the time or space cost of the execution plan or the combination of the time cost and the space cost of the execution plan.

In the practical application, the optimizer may be implemented in many ways and the following is examples.

The optimizer in the docbase management system shown in FIG. 2 may select the optimum execution plan according to priorities of the experience rules. Provided the judgment criterion of the optimizer includes L experience rules, namely $R_1, R_2, \ldots, R_L$, and without loss of generality, the priorities of the experience rules follow the inequality $R_1 > R_2 > \ldots > R_L$, the optimizer will work as follows.

Step a1: An execution plan set is initiated with all generated execution plans, and $R_i$ is set as the judgment criterion to be applied currently, wherein i=1 in the initial status.

Step a2: whether the execution plans in the execution plan set meet the judgment criterion $R_i$ is determined in turn. If an execution plan does not meet the judgment criterion $R_i$, the execution plan is marked and deleted from the execution plan set.

Step a3: if the execution plan set becomes empty, the execution plans marked in Step a2 are put into the execution plan set and whether i equals to L is determined, if i equals to L, an execution plan is selected from the execution plan set at random as the optimum execution plan based on priorities of the experience rules; otherwise 1 is added to i and Step a2 is repeated.

The optimizer in the docbase management system shown in FIG. 2 also may select the optimum execution plan according to weights of the experience rules. Provided the judgment criterion of the optimizer includes L experience rules, namely $R_1, R_2, \ldots, R_L$, without loss of generality, the weight of the rule $R_i$ is identified as $PR_i$, and every execution plan has a weight, the optimizer will work as follows.

Step b1: the initial weights of all the execution plans are set to 0.

Step b2: whether the execution plans meet the judgment criterion $R_i$ (i=1 ..., L) is determined in turn. If an execution plan meets the judgment criterion $R_i$, $PR_i$ is added to the weight of the execution plan.

Step b3: an execution plan with the largest weight is selected as the optimum execution plan according to the weights of all the execution plans. When multiple execution plans have the same largest weight, any one of these execution plans may be selected as the optimum execution plan based on the weights of the experience rule.

Both the above two types of the optimizers select the optimum execution plan based on experience rules. In another embodiment of the present invention, the optimizer also may select the optimum execution plan based on the cost of the execution plan.

The cost of the execution plan includes time cost and space cost. The time cost includes the time spent on executing the whole execution plan, which mainly includes the disk I/O time. The space cost includes the maximum space that may possibly be occupied by a final result and intermediate results during the execution of the whole execution plan. The space cost is calculated based on the memory and disk space to be occupied.

If the optimum execution plan is selected based on the time cost of the execution plan, the optimizer divide an execution plan into basic operations, the time cost of each of the base operations is multiplied by the executing times of each of the base operations and the total time of the execution plan can be calculated by summing the multiplying results of the base operations. Usually the optimizer traverses the whole execution plan in recursion to learn how many times each of the basic operations will be carried out and then calculates the total time needed for the execution plan.

Unlike the calculation of time cost for the execution plan, the calculation of space cost usually refers the maximum space needed during the execution. The optimizer calculates from the bottom to the top in recursion, compares the space needed for current operation with current maximum space value, if the former one is larger, the optimizer replaces the current maximum space value with the space needed for the current operation. When the whole execution plan has been calculated, the maximum space needed for the execution plan, i.e., the space cost of the execution plan, is obtained.

In detail, the optimizer may select the optimum execution plan depending on the time costs of the execution plans. Provided an execution plan has a tree structure and the basic operations of the execution plan include ($OP_1, OP_2, \ldots, OP_n$) and the time cost function of the execution plan is indicated as TIME_CALC(NODE node), the calculation of TIME_CALC is show as follows.

c1: the initial execution time variable T is set to 0.

c2: $T=T+\Sigma TIME\_CALC(SUB_i)$ is calculated, wherein $SUB_1, SUB_2, \ldots, SUB_m$, are the sub nodes of node and the dummy variable i ranges from 1 to m.

c3: the times of carrying out each basic operation concerning node is calculated, wherein $C_i$ indicates the times of carrying out $OP_i$ and $OT_i$ indicates the time needed for $OP_i$; and then $T=T+\Sigma C_i*OT_i$ is calculated, wherein, the dummy variable i ranges from 1 to n.

c4: the value of T is returned as the result of TIME_CALC.

The optimizer also may select the optimum execution plan based the space costs of the execution plans. Provided an execution plan has a tree structure and the basic operations of the execution plan include ($OP_1, OP_2, \ldots, OP_n$), and the space cost function of the execution plan is indicated as SPACE_CALC(NODE node), the calculation of SPACE_CALC is show as follows.

d1: the initial execution space variable S is set to 0.

d2: $S=MAX(S, SPACE\_CALC(SUB_i))$ is executed, wherein $SUB_1, SUB_2, \ldots, SUB_m$ are sub nodes of node and the dummy variable i ranges from 1 to m.

d3: the times of carrying out each basic operation concerning the node is calculated, wherein $C_i$ indicates the times of carrying out $OP_i$ and $OT_i$ indicates the space needed for $OP_i$; and then $S=MAX(S, SUM(C_i*OT_i))$ is calculated, wherein, the dummy variable i ranges from 1 to n.

d4: the value of S is returned as the result of SPACE_CALC.

From the description above, it can be seen that the optimum execution plan is selected from the execution plans by the optimizer according to the judgment criterion, so the selected optimum execution plan usually requires lower time or space cost, therefore the performance of the whole docbase management system is improved.

In an embodiment of the present invention, the optimizer may select the optimum execution plan directly from the execution plans generated by the planner, as mentioned above. In addition, the optimizer also may optimize the execution plans generated by the planner by using an artificial intelligence algorithm, e.g., a genetic algorithm or an artificial neural network algorithm, and then select the optimum execution plan from the optimized execution plans.

The execution plans are optimized by associating the cost or other measurement parameters of the execution plans as a measurement function with a measurement in the intelligence algorithm, e.g., adaptability in the genetic algorithm or energy in a simulated annealing algorithm, and the space of the execution plans is searched by using those algorithms to get the partially optimized execution plans.

Several methods for optimizing the execution plans by the optimizer will be described as follows.

A method for optimizing the initial execution plans with the genetic algorithm is described as follows. For every initial execution plan, following steps are performed.

e1: an execution plan tree (a tree structure of the execution plan) is coded into strings to get a string set as the initial population for the genetic algorithm;

e2: the execution time or space is considered as a measurement function of adaptability, and the evolution of the initial population is started;

e3: once the number of offspring reaches a preset number, the evolution is stopped and then the final population is decoded into an execution plan (i.e., an optimized execution plan).

It should be pointed out that rather than the execution time or space, other measurement values, e.g., the times of acquiring the page bitmap of the document, also may be considered as the measurement function of adaptability.

A method for optimizing the initial execution plans with the simulated annealing algorithm is described as follows. For every initial execution plan in an execution plan set, following steps are performed.

f1: C is used to indicate the present execution plan and B is used to indicate the optimized execution plan. In the initial status, B is set as C;

f2: an initial temperature is set as T;

f3: an initial temperature decrease factor ALPHA is set as a value between 0 and 1;

f4: when T is greater than a preset halt temperature value FT, following operations are repeated in sequence;

f41: under the present temperature, when the number of times of carrying out the following operations is lower than a preset value COUNT, following operations are repeated in sequence;

f412: the present execution plan C is copied to a temporary execution plan W;

f413: W is adjusted finely at random, and during the adjusting process, it should be ensured that W is equivalent to C;

f414: the energy of C and W (i.e., the execution costs of C and W), namely Ec and Ew are calculated respectively;

f415: if Ec>Ew, W is copied to C and B;

f416: if Ec<=Ew, following calculations are performed.

the value of TEST is initialized as a random value between 0 and 1;

DFLTA=Ew−Ec is calculated;

RESULT=EXP(−DELTA/T) is calculated;

if RESULT is greater than TEST, W is copied to C;

f42: the present temperature is lowered according to the equation T=T*ALPHA;

f5: the execution plan B is copied to C.

Besides the two algorithms described above, other algorithms such as an evolutionary algorithm, heuristic algorithm, branch and bound algorithm, hill climbing algorithm, artificial neural network algorithm or dynamic programming algorithm may also be adopted for optimizing the execution plans. The strategies used by other algorithms for optimizing the initial execution plans are similar to the two algorithms described above.

Through partially optimizing the initial execution plan, the cost of selected optimum execution plan is further lowered, and performance of the whole docbase management system is further improved.

It should be pointed out that any one or any combination of the parser, planner, optimizer, executor and the storage manipulating module in the present invention may be implemented as an independent module. For example, in the Windows system, the modules may be implemented as individual DLLs respectively or be combined into one DLL. In the Linux system, the modules may be implemented as individual .so files respectively or be combined into one .so file. In a programming environment, the modules may be implemented as individual .class files respectively or be combined into one .class file.

The modules may be developed with any of the programming languages including C, C++, Python, Ruby, Perl, SmallTalk, Ada, Simula, Pascal, Haskell, etc.

In another embodiment, the optimizer in the docbase management system provided by the present invention is further adapted to optimize the selected preferable execution plan. At this time, the executor executes the optimized preferable execution plan to schedule the storage manipulating module to execute the operations on physical storage in the optimized preferable execution plan. The method of optimizing the preferable execution plan is similar with the process of optimizing the execution plans generated by the planner described above.

So, in an embodiment, the process for obtaining the execution plan executed by the executor may include:

the optimizer optimizes the execution plans and selects the preferable execution plan from the optimized execution plans, at the time, the executor executes the preferable execution plan; or, the optimizer selects the preferable execution plan from the execution plans and then optimize the preferable execution plan, at the time, the executor executes the optimized preferable execution plan; or the optimizer optimizes the execution plans, selects the preferable execution plan from the optimized execution plans, and then optimize the selected preferable execution plan, at the time, the executor executes the optimized preferable execution plan. When the number of the execution plans generated by the planner is only one, the optimizer may directly optimize the only execution plan and the executor executes the optimized execution plan.

Figure 3:
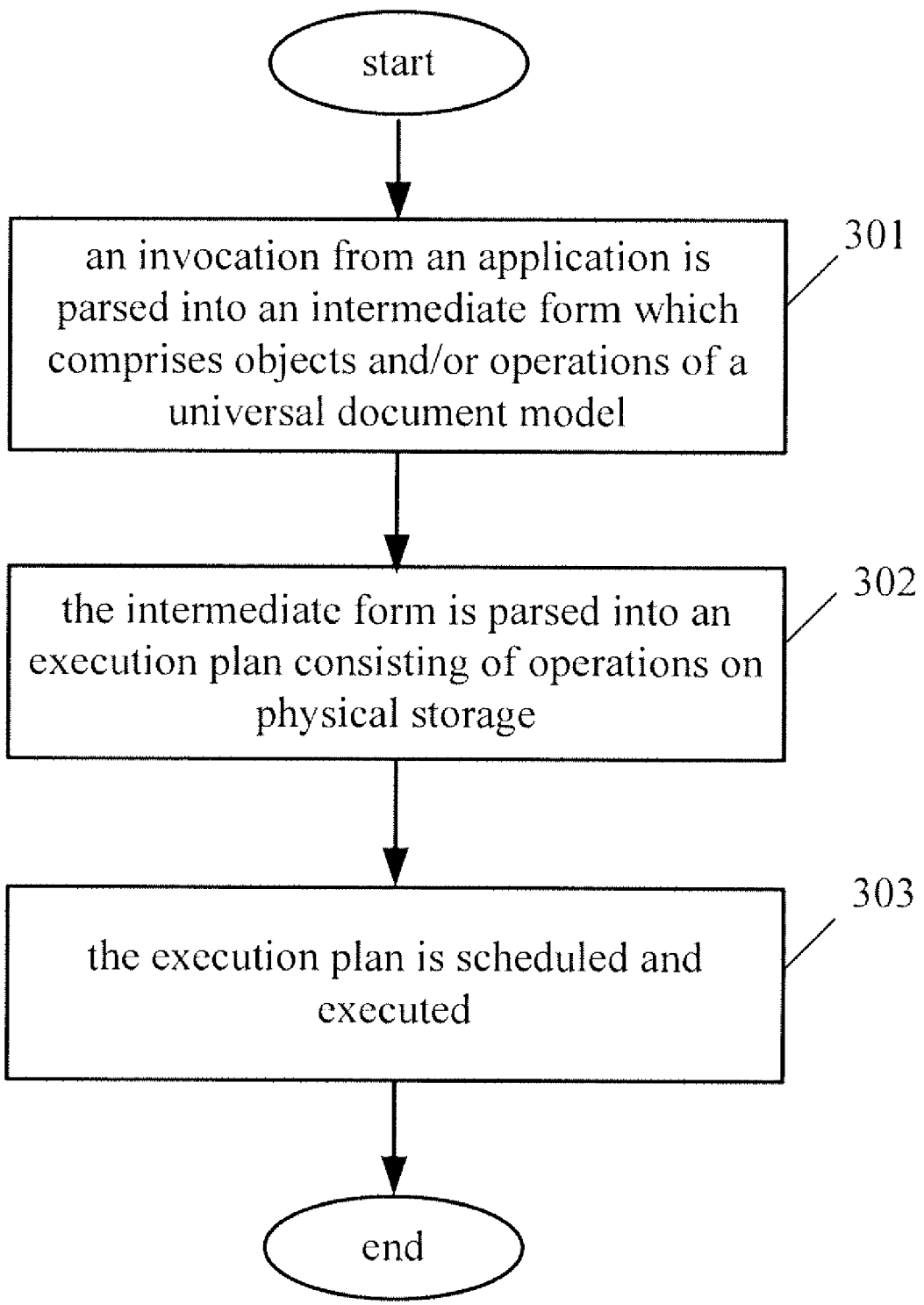
FIG. 3 is a flow chart of the method for implementing the docbase management system in accordance with the present invention.

FIG. 3 is a flow chart of a method for implementing the docbase management system in accordance with the present invention. As shown in FIG. 3, the method for implementing the docbase management system includes following steps.

Step 301: an invocation from an application is parsed to build an intermediate form consisting of objects and/or operations of a universal document model.

The invocation from the application to the docbase management system via a standard interface may use the UOML described in a prior patent application document on the docbase management system, or may use command strings, whatever, the invocation from the application should confirm to the universal document model given in the prior patent application document on the docbase management system. The invocation from the application is parsed based on the lexis and the syntax and is converted into the intermediate form which comprises objects and/or operations of the universal document model and in compliance with a standard interface. When the standard interface uses XML, an XML parser may be adopted to generate a DOM tree. When the standard interface users command strings which usually follow LALR(1) grammar, as long as the definition of the grammar is given, the command strings can be parsed by a lexical and syntax parser created by Lex and YACC.

Step 302: the intermediate form is converted into an execution plan which comprises operations on physical storage.

The objects and/or operations of the universal document model which constitute the intermediate form are logical operations and the logical operations are high level concepts, therefore a logical operation may be mapped to one operation on physical storage or a sequence of operations on physical storage, one logical operation may be mapped to different operations or sequences. Therefore an intermediate form may be converted into execution plans. Different execution plans may be generated based on the same intermediate form.

Taking an intermediate form represented by the syntax tree as an example, the process of converting the intermediate form into an execution plan includes following steps.

Firstly, all logical operations L_OP in the syntax tree are enumerated. The logical operations also may be sequences of logical operations.

Then, a physical operation set ($P\_OP_1$, $P\_OP_2$, . . . , $P\_OP_m$) that corresponds to L_OP is obtained, in which the physical operation $P\_OP_j$ also may be a sequence of physical operations.

After that, a physical operation $P\_OP_i$ is chosen for the L_OP.

Finally, the preceding steps to choose a physical operation for every logical operation are repeated until all the logical operations in the syntax tree are replaced with corresponding physical operations and an execution plan is thus generated.

The conversion of the DOM tree or other kinds of intermediate forms is similar to the conversion process described above.

Step 303: the execution plan is scheduled and executed.

Recursion starts from the root node of the tree corresponding to the execution plan and goes from top to the bottom until leaf nodes of the tree are reached, and then the actual operations are performed from bottom to the top of the tree to complete the whole execution plan.

In the above method for implementing the docbase management system, when the interfaces between every two steps are in compliance with the standard interface standard, the steps are independent of each other. Therefore, the whole docbase management system is well extendable, scalable and maintainable.

In the above flow, if several execution plans are converted from the intermediate form in Step 302, Step 302 further includes the following steps.

Step 3021: the intermediate form which comprises objects and/or operations of the universal document model is converted into execution plans.

The objects and/or operations of the universal document model which constitute the intermediate form are logical operations, the logical operations are high level concepts, therefore a logical operation may be mapped to one physical operation or a sequence of physical operations, one logical operation may also be mapped to different physical operations or sequences. Therefore an intermediate form may be converted into execution plans. And the execution plans may be generated at random based the intermediate form which comprises the logical operation.

Step 3022: an optimum execution plan is selected from the execution plans according to a judgment criterion.

In the above Step 3022, the optimum execution plan is selected from a generated execution plan set according to the judgment criterion. It should be pointed out that the "optimum" execution plan is selected based on the judgment criterion or practical requirements. For example, an optimum execution selected to meet the judgment criterion which require shortest execution time may need large execution space, therefore the execution plan will not be the "optimum" when the judgment criterion require smallest execution space. The judgment criterion may be based on experience rules or the cost of the execution plan, i.e., the time or space cost of the execution plan or the combination of the time cost and the space cost of the execution plan.

Specifically, operations in Step 3022 may be implemented in many ways and the following is examples.

A method for selecting the optimum execution plan according to priorities of the experience rules is described as follows. Provided the judgment criterion includes L experience rules, namely $R_1, R_2, \ldots, R_L$, and without loss of generality, the priorities of the experience rules follow the inequality $R_1 > R_2 > \ldots > R_L$, the selection process is explained as follows.

b1. an execution plan set is initiated with all the generated execution plans and $R_i$ is set as the judgment criterion to be applied currently, wherein i=1 in the initial status.

b2. whether the execution plan in the execution plan set meet the judgment criterion $R_i$ is determined in turn. If an execution plan does not meet the judgment criterion $R_i$, the execution plan is marked and deleted from the execution plan set.

b3. If the execution plan set becomes empty, the execution plans marked in Step b2 are put into the execution plan set and whether i equals to L is determined. If i equals to L, proceed to the next step; otherwise 1 is added to i and Step b2 is repeated.

An execution plan is selected from the execution plan set at random as the optimum execution plan.

A method for selecting the optimum execution plan according to weights of the experience rules is described as follows. Provided the judgment criterion includes L experience rules, namely $R_1, R_2, \ldots, R_L$, and without loss of generality, the weight of the rule $R_i$ is identified as $PR_i$, the selection process is explained as follows.

The initial weights of all the execution plans are set to 0.

Whether the execution plans meet the judgment criterion $R_i$ (i=1, ... L) is determined in turn. If an execution plan meets the judgment criterion $R_i$, $PR_i$ is added to the weight of the execution plan.

An execution plan with the largest weight is selected as the optimum execution plan according to the weights of all the execution plans. When multiple execution plans have the same largest weight, any one of the execution plans may be selected as the optimum execution plan.

The above describes two examples of selecting the optimum execution plan according to experience rules, and the following will describe the process of selecting the optimum execution plan according to the cost of the execution plans.

The cost of the execution plan includes time cost and space cost. The time cost includes the time spent on executing the whole execution plan and the space cost includes the maximum space that may possibly be occupied by a final result and intermediate results during the execution of the whole execution plan. The disk I/O time involved in the execution makes up the main part of the time cost, so the calculation of the time cost mainly includes the calculation of the disk I/O time. The space cost is calculated based on the memory and disk space to be occupied.

The method for calculating the time cost and the space cost of the execution plans is given in the preceding description of the optimizer.

Through generating the execution plans and selecting the optimum execution plan described in the above steps, the cost of the optimum execution plan is relatively lower. Therefore, the performance of the docbase management system is improved.

In the method for implementing the docbase management system provided by an embodiment of the present invention, between Step 3021 and Step 3022, the method may further include the process of optimizing the execution plans. And after the optimizing process, partially optimized execution plans may be obtained.

So in Step 3022, the optimum execution plan may be selected from the optimized execution plans.

The execution plans are optimized by associating the cost or other measurement parameters of the execution plans as a measurement function with measurement in an intelligence algorithm, e.g., adaptability in the genetic algorithm or energy in the simulated annealing algorithm, and then the space of the execution plans is searched by using those algorithms to get the partial optimized execution plans.

The algorithm used for optimizing the execution plans may include the genetic algorithm, the simulated annealing algorithm, etc., and the specific process is explained in the preceding description of the optimizer.

Besides the two algorithms described above, other algorithms such as an evolutionary algorithm, heuristic algorithm, branch and bound algorithm, hill climbing algorithm, artificial neural network algorithm or dynamic programming algorithm may also be adopted for optimizing the execution plans. The strategies used by other algorithms for optimizing the initial execution plans are similar to the two algorithms described above.

Through partially optimizing the initial execution plans, the cost of selecting optimum execution plan is further lowered, and performance of the whole docbase management system is further improved.

To sum up, in the docbase management system and the method for implementing the docbase management system provided by the present invention, the implementation of docbase management system is divided into a plurality of hierarchies and the hierarchies are independent of each other, which makes the docbase management system well extendable, scalable and maintainable. Also through the optimizer and the optimization algorithms provided by the present invention, the optimum execution plan is selected from execution plans so as to improve the execution performance and eventually improve the performance of the whole docbase management system. In addition, the initial execution plans generated by the planner is partially optimized, so that the cost of the selected optimum execution plan is further lowered and performance of the whole docbase management system is further improved.

The foregoing is only preferred embodiments of the present invention. The protection scope of the present invention, however, is not limited to the above description. Any alteration or substitution that is within the technical scope disclosed by the present invention and can easily occur to those skilled in the art should be covered in the protection scope of the present invention. Hence the protection scope of the present invention should be determined by the statements in Claims.

The invention claimed is:

1. A method for implementing a docbase management system, comprising:

parsing an invocation from an application to build an intermediate form which comprises objects and/or operations of a universal model;

converting the intermediate form which comprises objects and/or operations of the universal document model into execution plans;

selecting a preferable execution plan from the execution plans which comprises operations on physical storage according to an algorithm based on priorities of the experience rules;

scheduling and executing the preferable execution plan; wherein, selecting a preferable execution plan from the execution plans according to an algorithm based on priorities of the experience rules comprises:

when there are L experience rules, namely $R_1, R_2 \ldots R_L$, and the priorities of the experience rules follow the inequality $R_1 > R_2 > \ldots > R_L$, performing the following steps:

step a1: initiating an execution plan set with all generated execution plans, setting $R_i$ as the judgment criterion to be applied currently, wherein i=1 in the initial status, step a2: determining whether the execution plans in the execution plan set meet $R_i$ in turn; marking and deleting an execution plan which does not meet $R_i$ from the execution plan set;

step a3: if the execution plan set becomes empty, putting the execution plans marked in Step a2 into the execution plan set and determining whether i equals to L; if i equals to L, selecting an execution plan from the execution plan set at random as the preferable execution plan based on priorities of the experience rules; otherwise, adding 1 to i and repeating step a2.

2. A method for implementing a docbase management system, comprising:

parsing an invocation from an application to build an intermediate form which comprises objects and/or operations of a universal document model;

converting the intermediate form which comprises objects and/or operations of the universal model into execution plans;

selecting a preferable execution plan from the execution plans which comprises operations on physical storage according to an algorithm based on weights of the experience rules;

scheduling and executing the preferable execution plan; wherein, selecting a preferable execution plan from the execution plans according to an algorithm based on weights of experience rules comprises:

when there are L experience rules, namely $R_1, R_2, \ldots R_L$, identifying the weight of the rule $R_i$ as $PR_i$, performing the following steps:

setting the initial weights of all the execution plans to 0; determining whether the execution plans meet $R_i$ (i=1 ... L) in turn; if an execution plan meets $R_i$, adding $PR_i$ to the weight of the execution plan;

selecting an execution plan with the largest weight as the preferable execution plan according to the weights of all the execution plans.

* * * * *

UNITED STATES PATENT AND TRADEMARK OFFICE
CERTIFICATE OF CORRECTION

PATENT NO. : 8,312,008 B2  
APPLICATION NO. : 12/391495  
DATED : November 13, 2012  
INVENTOR(S) : Xu Guo and Donglin Wang Page 1 of 1

It is certified that error appears in the above-identified patent and that said Letters Patent is hereby corrected as shown below:

Title page, "item (76)" should read -- item (75) --.

Title page, column 1, above the (*) Notice insert item (73), -- Assignee:   Sursen Corp., China --.

Signed and Sealed this  
Eleventh Day of February, 2014

Michelle K. Lee  
*Deputy Director of the United States Patent and Trademark Office*